(12) United States Patent  
Eikman (10) Patent No.: US 7,317,195 B2  
(45) Date of Patent: Jan. 8, 2008

(54) QUANTITATIVE TRANSMISSION/EMISSION DETECTOR SYSTEM AND METHODS OF DETECTING CONCEALED RADIATION SOURCES

(76) Inventor: Edward A. Eikman, 5116 Longfellow, Tampa, FL (US) 33629

( * ) Notice: Subject to any disclaimer, the term of this patent is extended or adjusted under 35 U.S.C. 154(b) by 137 days.

(21) Appl. No.: 11/102,041

(22) Filed: Apr. 8, 2005

(65) Prior Publication Data

US 2007/0278423 A1    Dec. 6, 2007

Related U.S. Application Data

(60) Provisional application No. 60/560,426, filed on Apr. 8, 2004.

(51) Int. Cl.
*H05B 33/00* (2006.01)
(52) U.S. Cl. .............................. 250/484.5; 250/370.09
(58) Field of Classification Search ............ 250/484.5, 250/370.11, 358.1, 370.09, 370.06, 281, 390.1, 250/492.21, 492.1, 370.08; 600/407
See application file for complete search history.

(56) References Cited

U.S. PATENT DOCUMENTS

| | | | |
|---|---|---|---|
| 4,291,227 A | | 9/1981 | Caldwell et al. |
| 5,153,439 A | | 10/1992 | Gozani et al. |
| 5,629,971 A | * | 5/1997 | Jones et al. ................. 378/145 |
| 5,692,028 A | | 11/1997 | Geus et al. |
| 5,692,029 A | | 11/1997 | Husseiny et al. |
| 5,960,054 A | | 9/1999 | Freeman et al. |
| 6,080,989 A | * | 6/2000 | Royle et al. ................. 250/366 |
| 6,178,218 B1 | * | 1/2001 | Akers et al. ................. 376/159 |
| 6,347,132 B1 | | 2/2002 | Annis |
| 6,429,431 B1 | | 8/2002 | Wilk |
| 6,610,977 B2 | | 8/2003 | Megerle |
| 6,624,425 B2 | * | 9/2003 | Nisius et al. ................. 250/393 |
| 2003/0012324 A1 | * | 1/2003 | Haruyama .................. 376/159 |
| 2003/0147484 A1 | * | 8/2003 | Olshansky et al. ......... 376/157 |
| 2003/0164455 A1 | | 9/2003 | Hughes et al. |

OTHER PUBLICATIONS

Knoll, Glenn F., Radiation Detection and Measurement, John Wiley & Sons, Inc., Third Edition, 1999, pp. 53-54, 91, 94-96, 757-759, 761-762, 771-772.

* cited by examiner

*Primary Examiner*—Georgia Epps
*Assistant Examiner*—Francis M. LeGasse, Jr.
(74) *Attorney, Agent, or Firm*—Caesar, Rivise, Bernstein, Cohen & Pokotilow, Ltd.

(57) ABSTRACT

Apparatus and methods for screening inanimate objects for detecting concealed radioactive substances. The apparatus and method use a combination of at least one gamma-emission detector and the generation of a transmission image to non-invasively evaluate the contents of an inanimate object, such as a container, in order to determine the presence of absence of a radioactive substance. A variety of configurations of gamma-emission detectors and transmission detectors may be used to rapidly scan objects for the presence or absence of a radioactive substance.

7 Claims, 5 Drawing Sheets

QUANTITATIVE TRANSMISSION/EMISSION DETECTOR SYSTEM AND METHODS OF DETECTING CONCEALED RADIATION SOURCES

CROSS-REFERENCE TO RELATED APPLICATIONS

This application claims the benefit of U.S. provisional application 60/560,426 filed Apr. 8, 2004.

FIELD OF THE INVENTION

The present invention relates to efficiently screening containers for concealed radiation sources. The present invention identifies containers that contain, or could contain radiation sources above a pre-specified activity, and minimizes the time required to examine containers for concealed radiation sources.

BACKGROUND OF THE INVENTION

The interdiction of contraband radioactive material, illicit drugs, explosives, and other contraband is an important goal of law enforcement. To that end, a variety of technologies have been developed and deployed for the non-intrusive inspection of containers not readily susceptible to visual scrutiny from the outside. The non-intrusive aspect of these inspection techniques is important; the great majority of containers do not carry contraband, and the public would not long tolerate the delays, disruption (and in some cases damage) of property, and invasions of privacy that would occur if invasive inspection means were commonly used. Non-intrusive inspection is typically non-destructive and can usually be accomplished faster than intrusive inspection, thereby increasing productivity of inspectors. Increased productivity means more containers inspected and more contraband interdicted.

The present invention is primarily concerned with the non-intrusive inspection of containers for the presence of contraband radioactive material. Such material could be used to create nuclear bombs or radiological dispersal devices (RDD)—known as "dirty bombs," to contaminate food or water supplies, or potentially to further the cause of terrorism.

Contraband radioactive material could be smuggled in nearly any size container including, for example, luggage, or large cargo containers. Only a small volume of such material would be required to make a device capable of large-scale destruction or contamination. In light of this problem, a large number of containers of varying sizes would have to be monitored for the presence of contraband radioactivity in order to prevent a potential nuclear catastrophe. Accurate detection is of paramount importance due to the potentially disastrous consequences of permitting even a single container with contraband radioactivity past a monitored checkpoint. Additionally, due to the number of containers that would have to be surveyed, such surveying would have to be as fast and efficient as possible to be of any real utility in practical applications. Slow survey times would impose unbearable burdens of commerce and the flow of traffic through checkpoints.

One current method for screening containers for the presence of radioactive isotopes is to blindly survey external surfaces of the container, using an emission detector. The method is demonstrated by U.S. Pat. No. 4,291,227 (Caldwell, et al). A problem with this method is that sensitivity for detection varies in an unknown manner, over orders of magnitude, depending on the location and effectiveness of any shielding within the container. Consequently, any survey conducted within any reasonable time will likely fail to detect shielded sources. Additionally, in order to perform a blind external survey that would locate shielded contraband radioactive material would be prohibitively time-consuming if the maximum shielding is assumed for safety purposes, yet without knowledge of the potential effect of shielding within the container, it is not possible to estimate how much radioactive material may escape detection.

An additional drawback of the system is that if detectors with large field of view and large surface areas are used, the background radioactivity produced by the contents of the container is also included within the field. Well known sources of background that impair monitoring include natural radioactivity of the constituent materials of the detector itself, and of nearby equipment, supports, and shielding, terrestrial radiation, construction materials, radioactivity in the air surrounding the detector, and the primary and secondary components of cosmic radiation. Electronic noise of the instrument itself may also be apparent as background. It is desirable that the ratio of the radioactivity of interest to the background be as high as possible, to favor detection. Large field of views detectors tend to capture more background radioactivity, so the target-to-background ratio, an index of the signal to noise for detection, is degraded. The quantity and distribution of background radiation in a container may vary, and blind emission scanning may be insensitive to the quantity and location of these variations within the container. A special case of emission imaging to detect contraband materials, including special nuclear materials (SNM) or explosives and other contraband is neutron activation Neutron activation is commonly performed blindly, without quantification of the effect of shielding materials in the cargo on the sensitivity of the method.

Another method for the detection of contraband radioactive material is strictly through the use of transmission imaging (typically, digital planar or computed tomographic X-rays). An example of this method, using high-powered X-ray transmission imaging is U.S. Pat. No. 6,347,132 (Annis). This method requires high-energy X-rays in a fixed installation or other shielded environment. Additionally, there is no provision for differentiating between high-density non-radioactive elements which are not gamma-emitters. This method, in common with other transmission image methods such as gamma rays, considered equivalent to a high energy X-ray, is also used to show objects that could possibly comprise shielding, or in some cases, radioactive materials themselves if high in density. Transmission imaging provides this and other valuable information, but is not satisfactory for detecting contraband radioactive sources when used alone for several reasons. Limitations of transmission imaging alone include: skilled personnel are required to interpret the images that are produced to determine whether or not further (intrusive) analysis is required. Image interpretation is flawed in that it is based on subjective criteria and, thus, detection may be readily avoided. Second, radioactive sources or shielding do not have any specific appearance, and many can easily escape detection (i.e., by appearing to be an otherwise innocent object): An important instance, liquid shielding, will typically elude this method, since they appear dense but otherwise innocent on transmission images. It is not apparent by inspection alone the quantity of radioactivity that shielding materials may conceal.

Thus, it is clear that the current methods of detecting contraband radioactivity are individually flawed in that they either will miss significant sources or will require excessive time to perform adequate surveys will be unacceptable to efficiently handle the volume of containers that would require analysis, require skilled observers, do not allow specification in advance of the sensitivity of the detection system, and do not allow efficient reduction of the effects of background activity.

SUMMARY OF THE INVENTION

The invention provides an apparatus and method for the detection of contraband radioactive material in an inanimate object, e.g., a container, through non-intrusive means. Insofar as the apparatus is concerned, it includes at least one gamma-emission detector and transmission imaging means. The detector operates in conjunction with the transmission imaging means to determine the presence or absence of the radioactive substance in the inanimate object.

Insofar as the method is concerned, it entails creating a transmission image of the internal portions of the inanimate object and evaluating gamma emissions from the object based on the transmission image created.

Other advantages and novel features of the invention will become apparent to those skilled in the art upon examination of the following detailed description of a preferred embodiment of the invention and the accompanying drawings.

DESCRIPTION OF THE PREFERRED EMBODIMENT OF THE INVENTION

Figure 1:
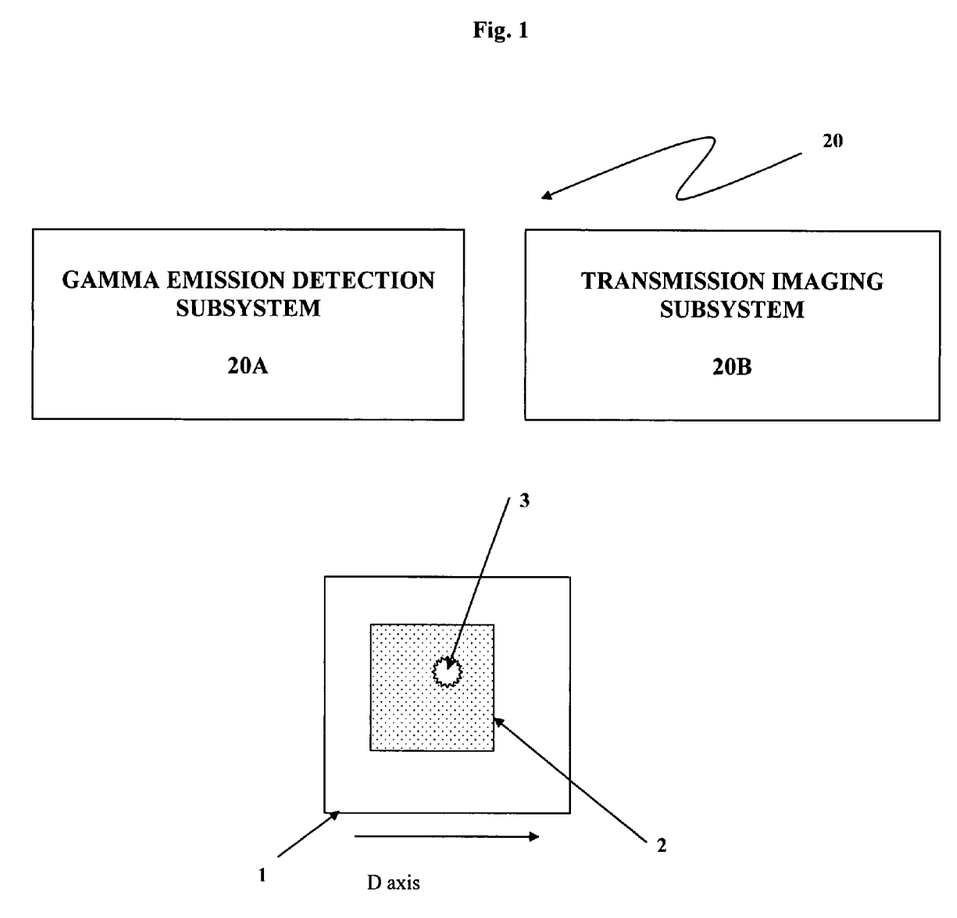
FIG. 1 is an illustration of an exemplary quantitative transmission/emission detector system.

Referring now to various figures of the drawings wherein like reference characters refer to like parts, there is shown at 20 in FIG. 1, a quantitative transmission/emission detector system. As will be described in detail later, the quantitative transmission/emission detector system effects gamma-emission scans (which may be non-energy resolved or in a preferred embodiment, energy resolved) of containers 1, at a rapid rate based on the size of the containers being monitored and the size and sensitivity of the gamma detectors. The scan senses the gamma energy released from the spontaneous decay of nuclear material and can optionally characterize the isotopic content of these elements in the containers based on the energy of the gamma rays released. The determination of the isotope(s) present through energy-resolved gamma analysis is known in the art and, thus, will not be further elaborated here. The containers are then evaluated using transmission imaging to determine the attenuation of the contents of the containers. This transmission imaging data is then used to determine whether or not the gamma scanning was sufficient to evaluate whether or not a pre-specified level of radioactive material emitting natural or induced gamma radiation of interest is present in the container. The transmission and emission imaging data are quantitatively co-registered as a map of the container that allows fusion of the two types of data. In the event that the attenuation of the container as determined in the transmission imaging reveals that some areas were not sufficiently scanned during the gamma scanning to detect a pre-determined level of concealed radioactivity, such containers are then segregated for further targeted gamma scanning based on the attenuation revealed in the transmission imaging or quarantined for intrusive evaluation or other analysis. Additionally, if the containers being evaluated emit gamma rays of appropriate energy levels and intensity, they would also be segregated or quarantined for further analysis.

Alternatively, the transmission imaging could occur prior to the gamma-emission scanning. In this particular configuration, the attenuation of the container would be used to adjust the scanning rate for discrete sections of the container being evaluated. This configuration permits segregation of containers into "faster scan" and "slower scan" groups in order to further facilitate the efficiency of detecting the contraband radioactive material. Larger or smaller, or both field-of-view emission scanners may be selected depending on the level of radioactivity found in innocent contents of the container.

As an additional alternative, a second gamma emission scan of the quarantined containers based on the attenuation analysis performed in conjunction with the transmission imaging can be performed.

As an additional alternative, the pre-specified detectable amount of radioactivity measurable while monitoring for the possible presence of radioactive sources of likely radionuclide emission of induced gamma emission categories is established as a criterion for passing a container without further inspection. The system, after an initial negative "fast" scan, determines it the minimum significant activity is present by comparing the count level of each target region such as the more highly shielded regions with other adjacent background radiation. As part of this, the count levels detected are corrected according to the attenuation potential of the shielding in the target region. If the shielding present is so great that this pre-specified amount of activity could be present but detection thereof potentially defeated by shielding, the container would be designated for further investigation before clearing for passage.

To improve the sensitivity of detection, a region of high density without grossly high levels of activity can be specifically compared with a comparable area of background activity by using smaller field of view, collimated detector to encompass just the region of interest within the primary detection field of view, and thereby increase the effective spatial resolution of the image. Another region's activity measurement can be used for background comparison. A similar effect can be achieved by analyzing two different regions of interest using a gamma camera image. The target activity of the smaller area can then be compared quantitatively with the background assignable to this smaller area by any of a number of well known target to background stochastic significance tests. This is an advantage over blind scanning techniques in that the size of detection area queried cannot be effectively controlled to reduce the assignable background. The selection of region of interest may be automatically determined from the transmission image, comparing regions of low attenuation established to be negative by the fast scan, as an alternative to by inspection if no operator intervention is desired. As will be apparent to those skilled in the art, the mix and constituents of cargos involved, the time available, the level of threat, and other practical considerations determine details of the approach to be followed.

As an additional alternative, after initial survey with large field of view detectors, high cost detectors with relatively small field of view may be selectively directed at specific regions designated to be of interest because of high attenuation or other features. High cost detectors may reduce inherent background of the detector itself because of construction features such as high quality passive shielding, active anticoincidence shielding, coincidence counting, high resolution gamma spectroscopy, high spatial resolution, and other methods known to the art.

In addition, the emission imaging could be aided through neutron interrogation for the initiation of signature gamma emissions. This would encompass irradiating the container ("interrogating the container") by bombarding the container with neutrons. When the container is interrogated, signature gamma emissions exiting the container due to the presence of nuclear materials can be detected in large arrays of scintillation detectors to produce useful signal count rates that are high enough to quickly identify a concealed radiation source therein. In a preferred embodiment, said generation of signature gamma emissions can optimally detected to increase the efficiency of the present invention.

Further configurations or modifications and increases in the efficiency of the method and apparatus described herein will be readily apparent to those skilled in the art.

Thus, the current invention will rapidly and non-destructively determine the presence or absence of radioactive material in various containers and help prevent the smuggling of radioactive material into or out of countries, installations, or facilities or otherwise transporting contraband radioactive material through any designated area. Additionally, the current invention reduces the hazard, inconvenience, and time consumed as compared to the analyses that are currently performed by blindly surveying containers or by relying on transmission imaging alone. By allowing pre-specification of a minimum detectable amount of radioactivity, the effectiveness of monitoring can be objectively adjusted according to the time and other resources available to optimize and control the approximate quantitative detection threshold for specific gamma emitting sources of interest.

The quantitative transmission/emission detector system described hereinafter serves to characterize materials that may be contained within a cargo container 1 and thus not readily susceptible to visual scrutiny. The quantitative transmission/emission detector system 20 basically comprises two subsystems, namely a gamma emission detection subsystem 20A and a transmission imaging subsystem 20B.

The subsystem 20B of the system 20 involves acquiring a quantitative transmission image. The characteristics of a material which might be the object of transmission imaging and which lend themselves to detection using the device and method taught by the invention include, but are not limited to, atomic number, mass density, linear dimensions and shape. These characteristics are unveiled by taking advantage of the various physical processes by which penetrating radiation interacts with matter. Penetrating radiation refers to electromagnetic radiation of sufficient energy per photon to penetrate materials of interest to a substantial and useful degree and include X-rays and other energetic forms of radiation. The interaction of such radiation with matter can generally be categorized as either scattering or absorption processes. Both types of process remove X-ray photons from a collimated (i.e., directional) beam; scattering processes do so by deflecting photons into new directions (usually with loss of energy); while absorption processes simply remove photons from the beam.

Figure 3:
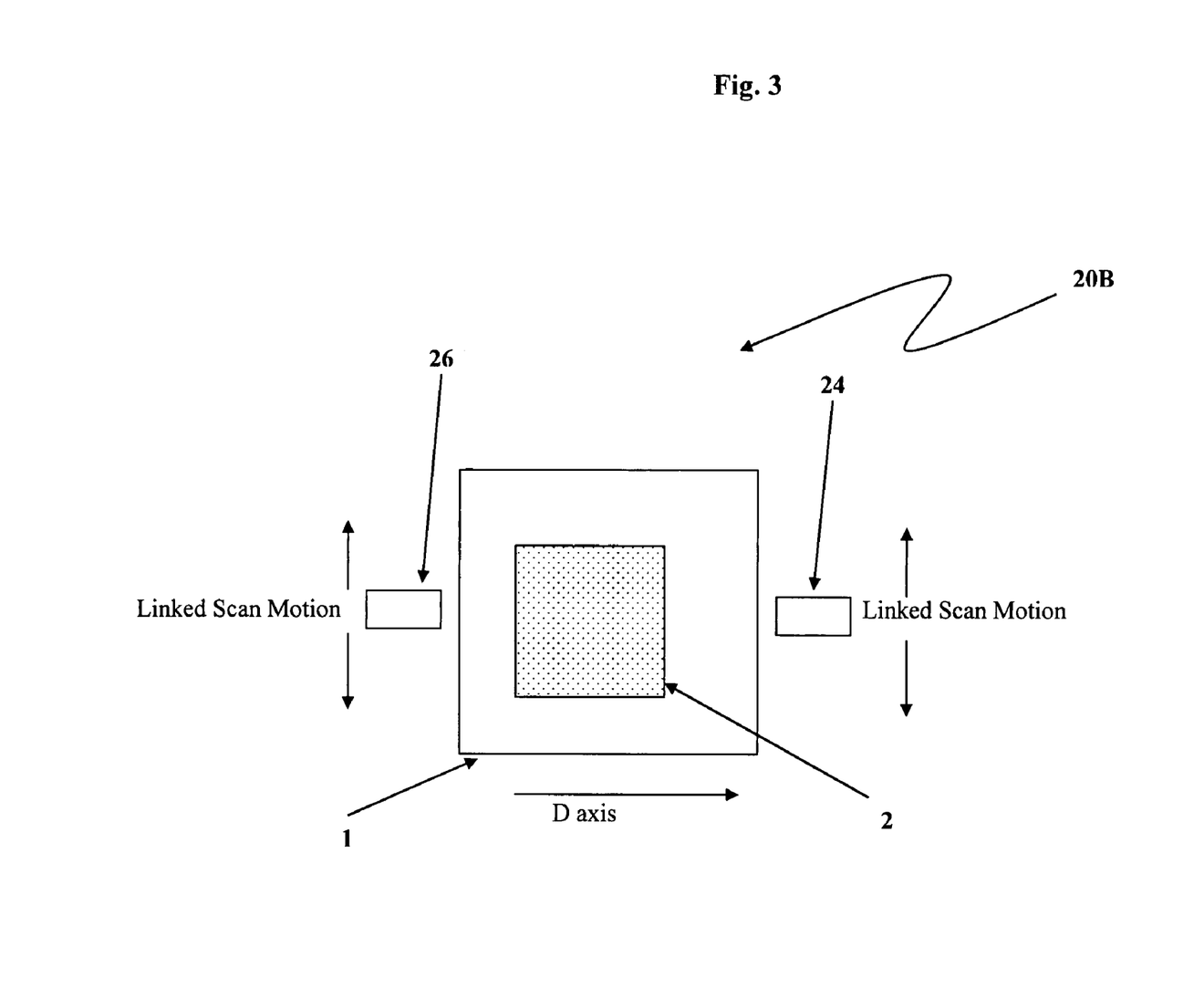
FIG. 3 is an illustration of an exemplary transmission imaging subsystem shown in FIG. 1 which is arranged to be used in conjunction with a gamma emission detection subsystem.

The transmission imaging subsystem 20B is shown in FIG. 3. As can be seen, the container 1 under investigation contains some amount of shielding material 2 within it. This configuration depicts a parallel linked scanning transmission imaging system with an X-ray source 24 opposite an X-ray detector 26. The X-ray source 24 and the X-ray detector 26 require motion relative to the container 1 in a linked fashion either through physical linkage or controlled linkage or through movement of the container 1 in order for the X-ray detector 26 to be in the path of the X-ray energy generated by the X-ray source 24. Many types of X-ray or similar transmission imaging are known in the art and could be substituted for this particular configuration. Not shown are the image generating, storing and evaluation components which are likewise known in the art and can be obtained from various suppliers.

Figure 4:
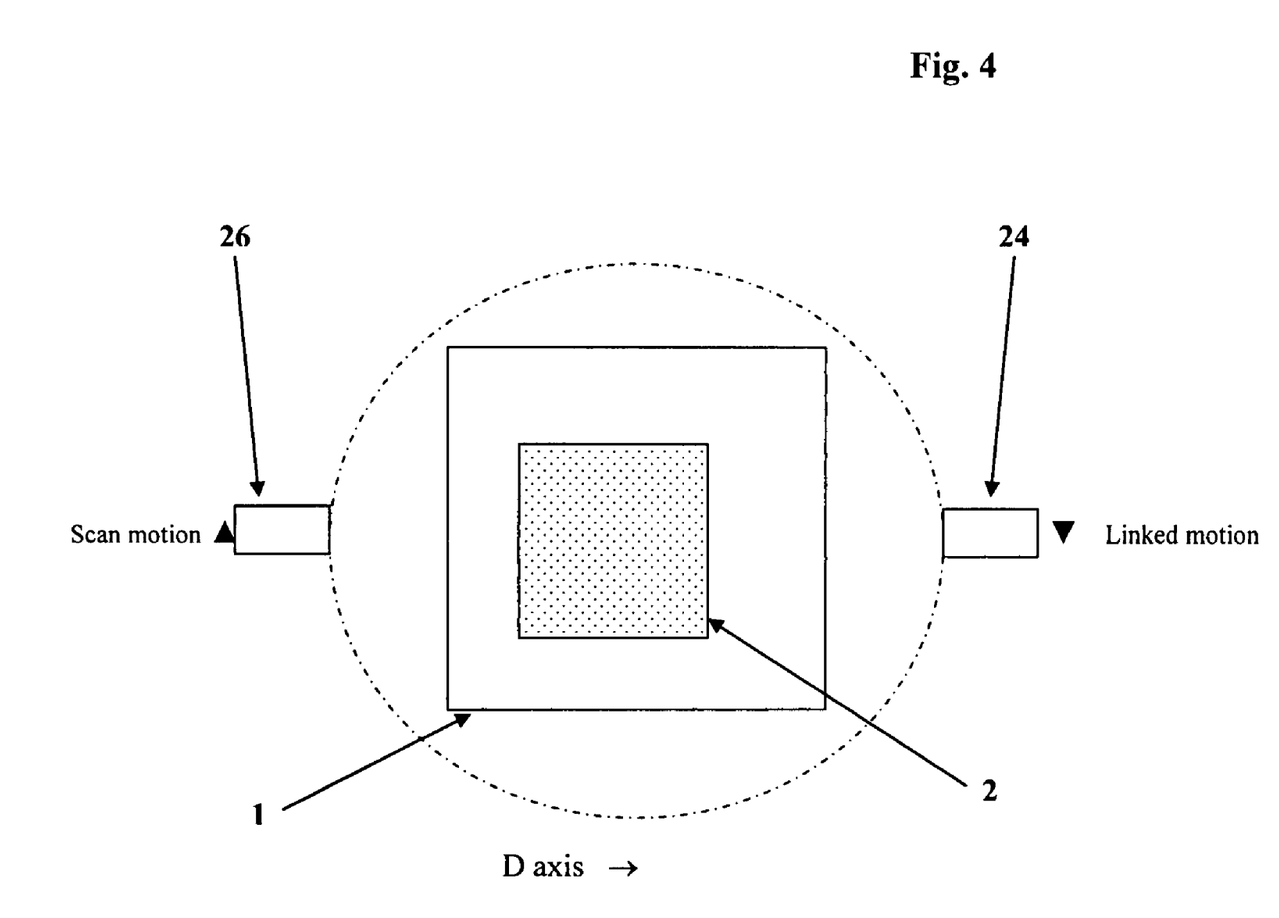
FIG. 4 is an illustration of an alternative arrangement for the transmission imaging subsystem shown in FIG. 3.

An alternative transmission imaging arrangement is shown in FIG. 4. This configuration is for computed tomography ("CT") imaging and thus uses circular linked motion of the X-ray source 24 and the X-ray detector 26 around the container 1 being analyzed. The shielding material 2 within the container 1 is still shown.

In addition, other means of acquiring a transmission image could readily be used to measure the dimensions of attenuating objects for indirect estimation of attenuation, or for direct measurement of attenuation. These include any of the myriad of non-invasive imaging techniques including, but not limited to, ultrasound, applied CT technologies, collimated gamma imaging, nuclear magnetic resonance and many others which are known to those skilled in the art.

Conventional transmission imaging measures the total beam attenuation as a function of position on the image plane, without discriminating between absorption and scattering processes. The total beam attenuation is described by a parameter called the "mass attenuation coefficient," as commonly employed by persons skilled in the art of X-ray inspection. The mass attenuation coefficient is a characteristic of a particular material at a specific X-ray photon energy, and is independent of the imaging geometry. As such, it is the sum of individual coefficients (or "cross sections") for each relevant physical process, each of which varies differently with X-ray energy and with the effective atomic number (Z) of the interacting material.

In the range of photon energies useful for penetrating and screening containers, the scattering contribution is dominated by incoherent, or Compton scattering, and the absorption contribution is dominated by the photoelectric effect. The cross sections for Compton scattering and photoelectric absorption vary with both the atomic number of the material and with the energy of the X-ray photon, but in very different ways. The photoelectric absorption decreases very rapidly with increasing photon energy, and increases very rapidly with increasing Z of the material. In a preferred embodiment, higher energy photons are employed for transmission imaging when higher attenuation substances are included in the cargo to be monitored.

Conventional transmission X-ray images simply provide a map of the attenuation characteristics of the inspected object for the full spectrum of the X-ray beam. It should be noted that images may be directly displayed in graphic format for the visual inspection by human operators, but need not be so displayed. As used in this description and in the appended claims, the term "image" refers to any multi-dimensional representation, whether in tangible or otherwise perceptible form or otherwise, whereby a value of some characteristic is associated with each of a plurality of locations corresponding to dimensional coordinates of an object in physical space, though not necessarily mapped one-to-one thereunto. Thus, for example, the graphic display of the spatial distribution of some feature, such as effective atomic number, in one or more colors constitutes an image. So, also, does an array of numbers in a computer memory or holographic medium. Similarly, "imaging" refers to the rendering of a stated physical characteristic in terms of one or more images.

There are several other options for transmission scanning including the use of gamma-emitting radionuclides such as Co-60 as a source of high energy radiation. Using a collimated source, the transmission can be mapped using a detection system for direct measurement of the attenuation. The principle behind this type of transmission scanning is well known to those skilled in the art.

Other means of transmission scanning would be readily apparent to one skilled in the art.

Another subsystem 20A of the system 20 involves the detection of gamma energy emitted from a source within the container being analyzed. Although a variety of gamma emission detectors (e.g., large volume liquid scintillators) will be apparent to one skilled in the art for use in the gamma-emission subsystem, an emission detector used for the preferred embodiment is a NaI detector. At Co-60 energies (E=1.17 MeV and 1.33 MeV), a 5-inch thick NaI detector would provide approximately 90% efficiency. NaI detectors are now available in large geometry formats and are in essence, molded NaI chips and if energy resolution is not critical, can be relatively inexpensive. On example for such NaI detectors is the Canberra system (FAST SCAN) composed of two large NaI crystals (3 in×5 in×16 in) or (7.6×12.7×40.6 cm).

Figure 2:
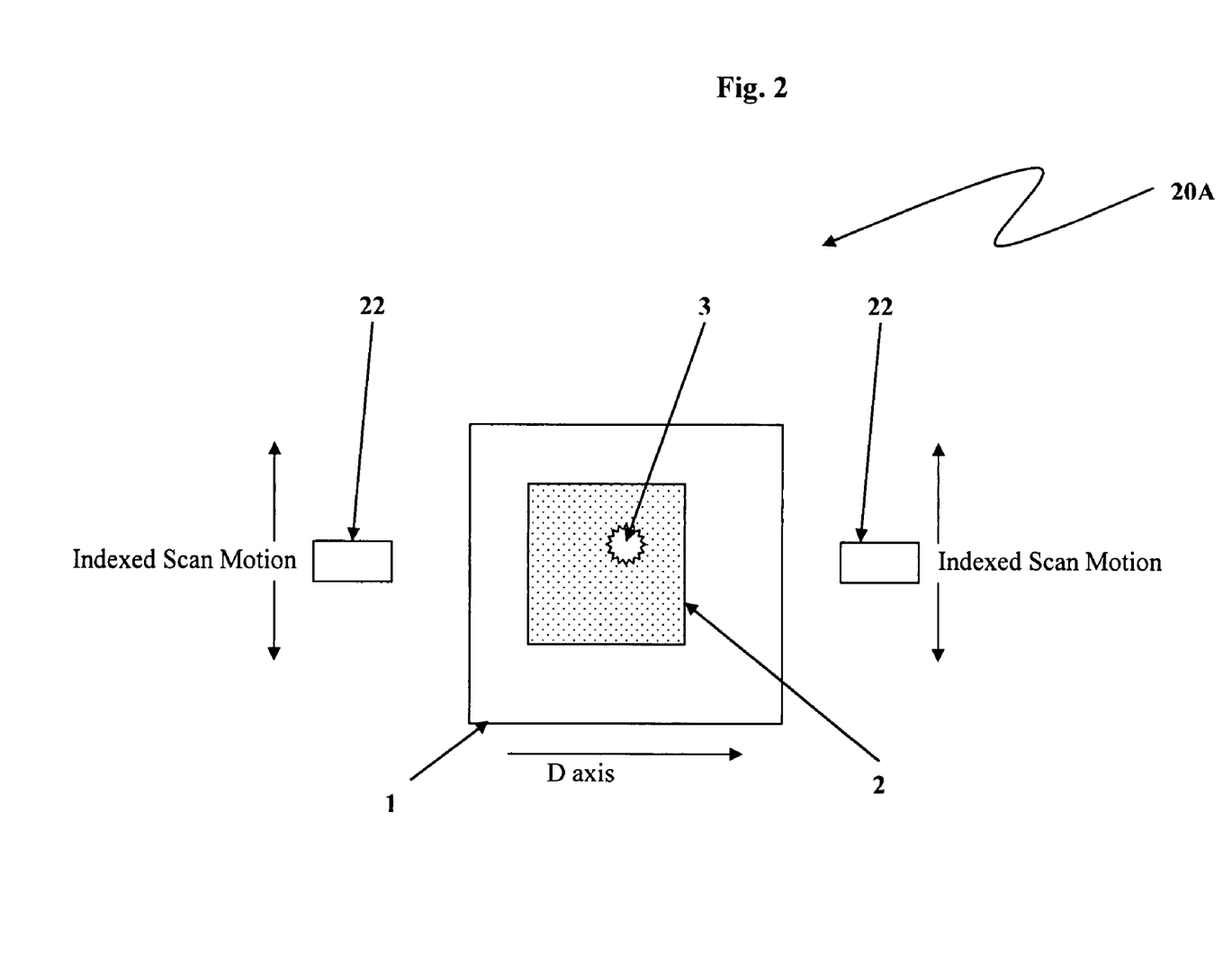
FIG. 2 is an illustration of an exemplary gamma emission detection subsystem shown in FIG. 1 which is arranged to be used in conjunction with a transmission imaging subsystem in accordance with another aspect of this invention.

The gamma-emission detection subsystem 20A is shown in FIG. 2. FIG. 2 shows an exemplary container 1 being analyzed within which is some amount of shielding material 2 enclosing concealed radioactive material 3 (as might be configured by a terrorist). In order to screen that container 1, one exemplary subsystem of this invention is provided, which makes use of two gamma-emission detectors 22. The detectors 22 are arranged, one on each side of the container 1 to scan planar areas parallel to each other while they pass along the container 1. The scanning motion of the scanners can be linked either physically or not or, alternatively, such motion can be separately controlled without linkage so long as the scanning action is indexed to a survey matrix that covers each of the parallel planes in their entirety. Relative motion between the container and the gamma emission detectors is required to scan each of the parallel planes, thus moving the container vice moving the detectors is an alternative embodiment of this subsystem. Note that the furthest distance from either gamma-emission detector 22 is the centerline of the container, effectively halving the size of the container being analyzed. The depiction in FIG. 2 may be used for a primary (or sole) gamma-emission scan or may be used for a secondary gamma-emission scan for covering discrete areas of attenuation which exceeds the threshold as determined through the use of the transmission imaging. Also this arrangement can be used with only one gamma-emission detector 22; however, this would necessitate increased scanning time, as the effective width of the container being analyzed would not be halved as shown, or a single detector may be used to scan first one, then the other side of the container to produce an indexed emission map. Alternatively, a multiplicity of detectors or detector positions may be similarly employed to cover the container from any desired angle. The reconstruction of emission images in desired axes by computational methods using data from multiple angles is well known to those skilled in the art of emission imaging.

In addition, the emission imaging could be aided through neutron interrogation for the initiation of signature gamma emissions. This would encompass irradiating the container ("interrogating the container") by bombarding the container with neutrons. Use of 14 MeV neutrons when interrogating the container is one possibility, but results in potential interference due to the activation of $^{16}O$. This $^{16}O$ interference is eliminated when lower energy neutron sources are utilized since the reaction threshold for $^{16}O(n,p)^{16}N$ is 10 MeV. Thus, the preferred energy neutrons for the interrogation of the container are 10 MeV. When the container is interrogated, signature gamma emissions exiting the container can be detected in large arrays of scintillation detectors to produce useful signal count rates that are high enough to quickly identify a concealed radiation source within the container. This generation of signature gamma emissions can be used to increase the efficiency of the present invention.

The concept of shielding and distance from the radioactive source should be familiar to those skilled in the art and, thus does not warrant extensive discussion here. As referred to herein, the distance and attenuation due to shielding of the radioactive source is expressed in terms of the half value layer (HVL) which represents the thickness of a material (including air) which attenuates half of the photon emissions, or alternatively, transmission photons from the source. HVL values for varying gamma, X-ray, or other photons are known in the art and can be applied to determine the shielding effect of material on transmission or emission photons within the containers being evaluated.

In the following example, the task is defined as screening a container for radioactivity to assure that no activity of 1 Curie (Ci) or more of radioactive Cobalt-60 (Co-60) will be un-detected under a variety of probable shielding configurations. Although Co-60 is being used for the following calculations, it is understood that the current invention could be used for any gamma emitting radioactive source, including, but not limited to the isotopes of Uranium, Plutonium, and other radioactive sources that might be covertly transported through a designated area or checkpoint, with or without enhancement of the emission detection signatures by neutron activation. In a preferred embodiment, the container is interrogated for Uranium and plutonium isotopes with high neutron cross sections for detection by neutron activation, instead of the relatively weak natural gamma emissions from isotopes of interest.

The model for this example is a 3 m high by 5 m long by 3 m deep container representing a "cargo" container that would be common in trucking or port facilities. It should be noted that smaller or larger containers would be analyzed using similar methods or apparatuses. This container will be surveyed for emissions long vertical sides using a parallel system of opposed detectors directed to either side of the container along the same D axis.

In that this example is attempting to detect Co-60, this discussion will evaluate the container using the gamma energy spectrum for this isotope, which is 1.17 MeV and 1.33 MeV. The calculations for the detection of other isotopes would be similar using the gamma energy spectrum for those isotopes. The preferred embodiment would include analysis for a number of different isotopes, including, but not limited to, Cesium isotopes, Uranium isotopes, and Plutonium isotopes.

Note that with the preferred opposed parallel arrangement of equivalent detectors along the D axis of the container, a source farther from one detector is correspondingly closer to the other detector. Consequently, the maximum shielding thickness encountered along the D axis of the container is half the container's diameter along the D axis. The detectors scan the survey matrix, corresponding to the vertical sides of the container. Scan motion is in planes perpendicular to the D axis. The detectors may be physically linked, moving together, or linkage may be achieved retrospectively, indexing by matching detection at specific D axis sites intercepting a survey matrix perpendicular to the D axis.

Known parameters of a 1 Ci Co-60 example state that $7.4 \times 10^{10}$ photons/sec would be released from the sample and would then result in an unattenuated flux of $2.62 \times 10^5$ photons/sec at a 1 cm detector at 1.5 m.

In that an objective of this invention is to increase the speed and efficiency of the analysis of containers which might contain concealed radioactive material, this example is directed to performing gamma scanning with less than 1 second per position interval for the gamma counters. This allows for a ten-minute preliminary survey of the example container, so the time available for each detector position is 0.4 seconds, based on 1,500 10 cm×10 cm detector positions within a 3 m×5 m survey matrix. For a 2% error range at 95% confidence, the system will need 10,000 total counts (assuming negligible background). For faster survey, more detectors may be used: ten detectors for each side would provide, for example, an equivalent survey in one minute.

As an example, assuming that 0.525 m of water shielding is encountered between the radioactive source and the detector 1.5 m away. The HVL of water at Co-60 is approximately 10.5 cm, thus, 50 cm of water constitutes about 5 HVL attenuation (factor of 32). Therefore, the water-attenuated flux at 1.5 m=$2.62 \times 10^5$ photons/(sec/cm$^2$) or $1.05 \times 10^5$ photons/(0.4 sec/cm$^2$), divided by 32 equals $0.0819 \times 10^5$ photons/(sec/cm$^2$). For a 100 cm$^2$ detector, $0.0819 \times 10^5$ photons/(sec/cm$^2$)×100 cm$^2$ equals $8.19 \times 10^5$ photons/sec. Thus, to detect 10,000 photons using a 10 cm×10 cm (100% efficient) detector would require about $1 \times 10^4$ photons/$8.119 \times 10^5$ photons/(sec)=0.012 sec. If a detector system is preprogrammed for 0.4 sec in initial screening for each site, this activity would be detected. Thus, for the purposes of the current example, this detection time, 0.4 sec, is more than sufficient to detect 1 Ci subjected to 5 HVL attenuation. The preliminary survey will actually detect emissions from over 6 HVL, (requiring 0.024 sec), over 7 HVL (requiring 0.048 sec), over 8 HVL (requiring 0.098 sec), and over 9 HVL (requiring 0.196 sec). For attenuation over 10 (requiring 0.39 sec), detect ability is borderline, and attenuation over 11 HVL is not detectable by the screening threshold. The calculations are representative only an approach to estimation of the sensitivity of an embodiment, and performance in actual use depends on cargos, instruments, and time available, and the emissions of interest.

Figure 5:
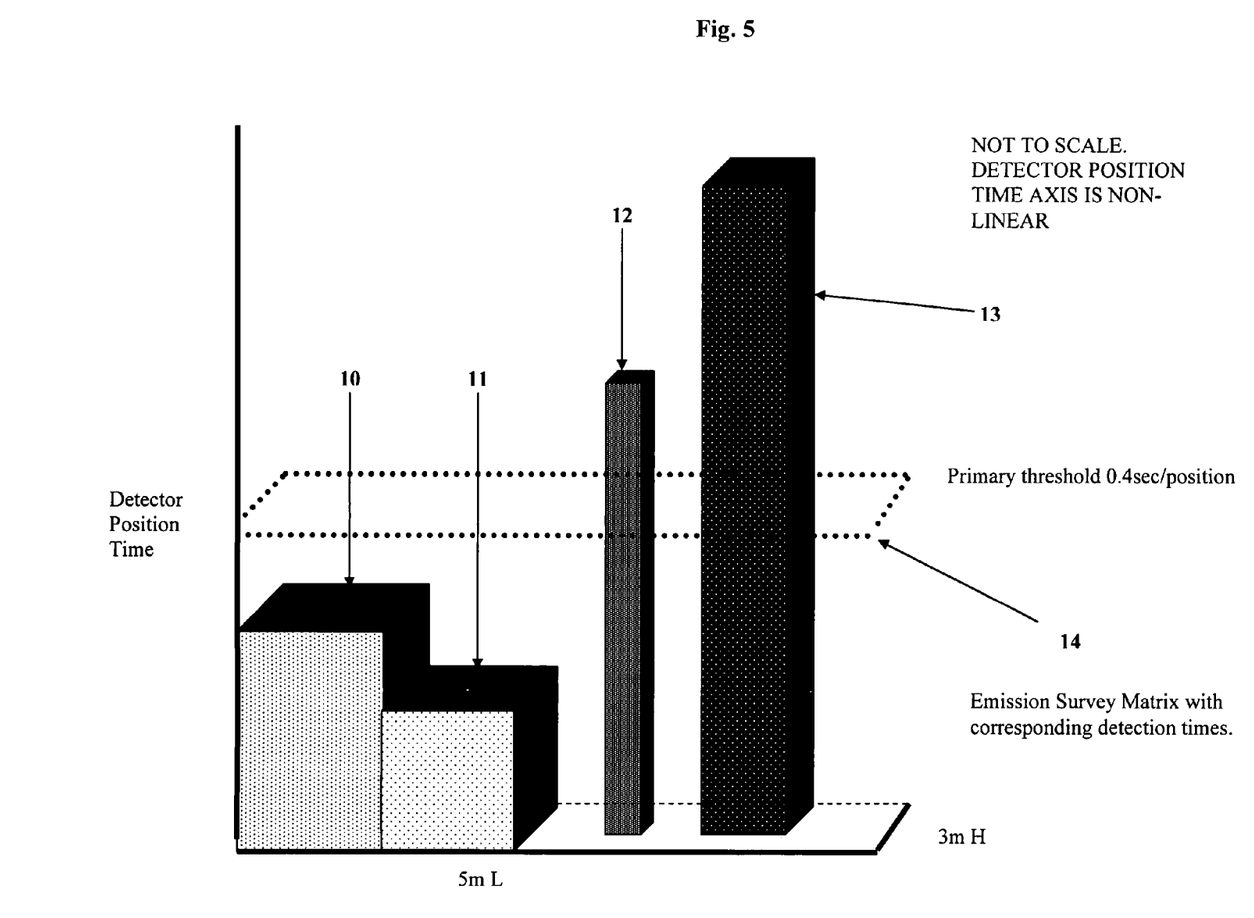
FIG. 5 is a bar graph showing scan detection times for an exemplary amount of contraband radioactive material within the container illustrated in FIGS. 1 and 2.

The required scan times for detection of a 1 Curie Cobalt-60 sample within a 3 m deep container as described above are graphically depicted in FIG. 5. The scan time in seconds is represented along the Y-axis with the bars depicting the time required to detect gamma emissions through various thicknesses/densities of shielding. The shielding shown includes 5HVL 10, 3HVL 11, 15 HVL 12, and 20 HVL 13 of attenuation representing the time required to detect the 1 Curie Cobalt-60 sample through such shielding. Also depicted is the primary threshold 14 for the initial scan time of 0.4 seconds per position. FIG. 5 clearly shows that for the 15 HVL 12 and the 20 HVL 13 attenuations, the primary threshold 14 has been exceeded and further scanning, analysis or quarantine of the container is therefore required.

Gamma emissions detected in the initial gamma-scanning would result in the segregation or quarantining of the container being analyzed due to the fact that this would indicate a radioactive source within the container.

Following the initial gamma emission scanning, the container being analyzed would then be analyzed by the acquisition of a transmission image to determine whether or not the initial gamma-emission scan was sufficient to detect any potential concealed radioactive material. Note that in alternative embodiments, the transmission imaging could occur prior to the initial gamma-emission scanning and/or be used to determine the scan time for each discrete position being evaluated.

A transmission image is acquired with at least one, or in the preferred embodiment, at least two planar projections: one along the axis of the detector, and one perpendicular to the axis of the detector. Note that in contrast to the emission detection set up, X-rays for the transmission imaging must traverse the full thickness of the shielding material in the D axis for detection, and the source and detector must be directly opposing on another along the D axis. An attenuation map is created corresponding to the survey matrix perpendicular to the D axis. The transmission imaging means in the preferred embodiment also creates an image perpendicular to the D axis and measures the projected thickness of the shield object along the D axis to allow estimation of potential attenuation without direct measurement of transmission by indirect estimation, using an assumed likely maximum attenuation of the material, such as lead density. Computed tomography, ultrasound, and other imaging methods are alternatives to the transmission imaging means described herein to acquire the attenuation and size information. Transmission images as used to estimate attenuation directly may be controlled by real time measurement of transmitted photons to control the image timing to assure optimal estimation of attenuation, whereas if insufficient transmission is achievable, indirect estimation method may be employed. This arrangement as described herein may vary in actual practice as would be recognized by one of skill in the art.

The transmission image information is stored electronically, allowing correlation with the survey matrix mapping of attenuation for each detector position. The transmission imaging for the preferred embodiment should be able to penetrate on the D axis the equivalent of up to 105 cm water (10 HVL for Co-60), allowing measurement of the transmitted energy within an accuracy of 5% or better, with a resolution of 5 cm or better. The art of timing of transmission imaging to achieve desired performance levels using real time measurement of transmissions detected is well known to those skilled in the art. The correspondence between the attenuation of the transmission imaging photons and the attenuation of the attenuation imaging photons targeted for detection is well known to those skilled in the art, so the measurement of transmission photons can be readily used to calculate the attenuation of emission images traversing the same material. Consequently, the transmission image can directly estimate the effective attenuation of emissions of every object up to 10 HVL along the detector axis, or 10/2=5 HVL for emissions. The 10 HVL amount is halved because the emissions can be considered to be originating from the center of any object if paired opposing gamma detectors are used. Likewise, the attenuation for other gamma rays can be estimated from the attenuation characteristics or one source. Whereas the HVL for lead is 1.10 cm for Co-60, the HVL for Cs 137 is 0.65 cm. This relationship allows estimation that a detection system would be more sensitive for detecting Cs-137 than for CO-60. Similar estimates can be made for other radionuclides or gamma energies of interest such as Ir-192 (HVL 0.55 cm), I-131 (HVL 0.72 cm). If a transmission source has the same photon energy as the emission sources of interest, no correction is necessary, but in a preferred embodiment, a single transmission source is used to estimate sensitivity for a variety of radionuclide emissions using the known attenuation characteristics for radionuclides most likely to be used depending on availability and other circumstances.

For lower power transmission imaging and for containers containing shielding greater than the resolution of the transmission imaging equipment, the attenuation is indirectly estimated from the dimensions of the object in the D axis, assuming lead HVL. This ensures the "worst case scenario" for analysis purpose and can allow for lower energy transmission imaging systems. Lead (Pb) is the densest shielding that is likely to be encountered because it is denser than most common metals, and is thus likely to be the worst case; the materials denser than lead, such as gold, platinum and uranium are uncommon and unlikely to be used for shielding.

The transmission image is then analyzed by an automatic analysis system that determines the directly estimated HVL value of each discrete area. Should any area exceed the threshold HVL value (8 HVL for the 1 Ci Co-60 sample used in this example [see FIG. 4]), the container may be subjected to a secondary gamma-emission detection scan with scan times per position based on the transmission image HVL calculation for the corresponding detector positions. Alternatively, the containers that exceed the threshold value for HVL could be segregated or quarantined for further inspection.

Alternative arrangements include the following general configurations: an initial transmission imaging followed by a subsequent gamma-emission scan (which can either be a 0.4 second/position scan or can be an adjusted scan rate commensurate with the HVL values at corresponding positions on the survey matrix as determined in the previous transmission imaging step); an initial transmission imaging followed by a primary gamma-emission scan at a rapid rate followed by a secondary gamma emission scan (at scanning rates according to the values that would be required to detect radioactive sources based on the HVL values at corresponding positions on the survey matrix as determined by the transmission imaging); an initial transmission imaging followed by segregation of containers based on the HVL values determined by the transmission imaging into those containers that can be scanned rapidly and those that would require increased scanning times in order to facilitate the quick clearance of objects containing only low density materials; and other arrangements that are apparent to those skilled in the art. Additionally, the preferred embodiment or the alternative arrangements can be used in conjunction with neutron interrogation of the container. The neutron interrogation of the container can be performed either on specific, high attenuation regions of the containers based on the transmission imaging or can be applied to the entire container to increase overall scan speed/efficiency due to the generation of signature gamma emissions. Each above configuration can also be used in conjunction with a conveyor system for automated processing of smaller containers (i.e. luggage, mail, parcels, boxes, etc.).

Without further elaboration, the foregoing will so fully illustrate this invention that others may, by applying current or future knowledge, readily adopt the same for use under various conditions of service.

I claim:

1. An apparatus for detecting radioactive material within an inanimate object, said apparatus comprising at least one gamma-emission detector and transmission imaging means, said detector operating in conjunction with said transmission imaging means to determine the presence or absence of the radioactive material in the inanimate object, said transmission imaging means being adapted to assess gamma ray attenuation characteristics within the inanimate object wherein said gamma-emission detector determines the presence of radioactive material based upon said assessment of said gamma ray attenuation characteristics wherein said transmission imaging means is arranged to detect the presence of the radioactive substance in the inanimate object by first creating a transmission image of the internal portions of the object, said gamma-emission detector being arranged to evaluate gamma emissions from the object by scanning the object at a rate based on the transmission image created.

2. The apparatus of claim 1 wherein said at least one gamma-emission detector comprises at least one primary gamma-emission detector and said at least one gamma-emission detector comprises at least one secondary gamma-emission detector, said at least one primary gamma-emission detector operating at a single scan speed, said at least one secondary gamma-emission detector operating at a speed determined through attenuation analysis of discrete areas identified in the transmission image as having high attenuation profiles.

3. The apparatus of claim 2 further comprising neutron interrogation of the inanimate object in conjunction with said gamma ray attenuation characteristics, said neutron interrogation being applied to portions of the inanimate object having high attenuation profiles prior to the operation of said at least one secondary gamma-emission detector.

4. An apparatus for detecting radioactive material within an inanimate object, said apparatus comprising at least one gamma-emission detector and transmission imaging means, said gamma-emission detector being arranged to detect gamma emissions from the inanimate object, said transmission imaging means being arranged to assess gamma emission attenuation characteristics of the inanimate object; said apparatus further comprising means for making an automatic determination if said gamma emission was sufficient to detect the presence or absence of the radioactive material in the inanimate object based on said assessment of gamma emission attenuation characteristics; wherein said at least one gamma-emission detector automatically scans areas of the inanimate object identified as having a high attenuation profile during the transmission imaging at scan rates based on said assessment of gamma emission attenuation characteristics, said apparatus further comprising means for neutron interrogation of the entire inanimate object.

5. A method for detecting the presence of radioactive material in an inanimate object comprising a. creating a transmission image of the internal portions of the inanimate object;

b. assessing gamma emission attenuation characteristics of said inanimate object based upon said transmission image;
c. evaluating gamma emissions from the inanimate object based on said assessment of gamma emission attenuation characteristics, to determine the presence or absence of the radioactive material in the inanimate object; wherein said evaluation of the gamma emissions is accomplished at a constant speed; and
d. providing a secondary gamma-emission scan at a variable speed wherein said variable speed is determined based on said assessment of gamma emission attenuation characteristics.

6. A method for detecting the presence of radioactive substances in an inanimate object comprising the steps of
 a. evaluating gamma emissions from the object wherein said evaluation of gamma emissions is accomplished at a constant speed;
 b. based on said evaluation of gamma emissions, creating a transmission image of the internal portions of the object to determine the whether any areas of the evaluated object require further analysis; and
 c. providing a secondary gamma-emission scan at a variable speed wherein said variable speed is determined through evaluation of attenuation characteristics of the object based on said transmission image.

7. A method for detecting the presence of radioactive substances in an inanimate object comprising
 a. creating a transmission image of the internal portions of the inanimate object;
 b. assessing gamma ray attenuation characteristics of the inanimate object based on said transmission image;
 c. interrogating the inanimate object using neutrons;
 d. evaluating gamma emissions from the object based on said assessment of gamma emission attenuation characteristics wherein said evaluation of gamma emissions is accomplished at a constant speed; and
 e. providing a secondary gamma-emission scan at a variable speed wherein said variable speed is determined through evaluation of the attenuation characteristics of the object as indicated in the transmission image.

* * * * *